United States Patent
Gudenburr et al.

(10) Patent No.: US 8,023,718 B1
(45) Date of Patent: Sep. 20, 2011

(54) METHOD AND SYSTEM FOR LINKING FRONT AND REAR IMAGES IN A DOCUMENT READER/IMAGER

(75) Inventors: John C. Gudenburr, Canton, MI (US); Michael J. Moore, Beverly Hills, MI (US); William L. Kozlowski, Novi, MI (US); Sammy C. Hutson, Novi, MI (US)

(73) Assignee: Burroughs Payment Systems, Inc., Plymouth, MI (US)

( * ) Notice: Subject to any disclaimer, the term of this patent is extended or adjusted under 35 U.S.C. 154(b) by 1249 days.

(21) Appl. No.: 11/653,696

(22) Filed: Jan. 16, 2007

(51) Int. Cl.
*G06K 9/46* (2006.01)
*G06K 7/08* (2006.01)
*G06Q 40/00* (2006.01)

(52) U.S. Cl. ........ 382/139; 382/207; 382/320; 235/449; 705/45

(58) Field of Classification Search .................. 382/140, 382/313, 314, 315, 320, 321, 323, 207, 137–139, 382/182, 183; 235/449, 450, 379, 436, 485, 235/493, 494; 705/45; 341/1, 6, 15; 360/39, 360/52
See application file for complete search history.

(56) References Cited

U.S. PATENT DOCUMENTS

| | | | | |
|---|---|---|---|---|
| 3,092,809 A | * | 6/1963 | Merritt et al. | 382/139 |
| 3,096,506 A | * | 7/1963 | Chao et al. | 382/139 |
| 3,104,381 A | * | 9/1963 | Gottschalk et al. | 360/110 |
| 3,185,962 A | * | 5/1965 | Ingham | 382/182 |
| 3,201,751 A | * | 8/1965 | Rabinow | 382/323 |
| 3,212,058 A | * | 10/1965 | Sanner | 382/139 |
| 3,221,303 A | * | 11/1965 | Bradley | 382/208 |
| 3,245,534 A | * | 4/1966 | Smith et al. | 209/534 |
| 3,246,293 A | * | 4/1966 | Shelton, Jr. | 382/182 |
| 3,270,320 A | * | 8/1966 | Christie | 382/223 |
| 3,316,536 A | * | 4/1967 | Andrews et al. | 382/139 |
| 3,461,427 A | * | 8/1969 | Parker | 382/183 |
| 3,521,235 A | * | 7/1970 | Becker | 382/155 |
| 3,528,058 A | * | 9/1970 | Bond | 382/207 |
| 3,541,508 A | * | 11/1970 | Vaccaro | 382/139 |
| 3,571,793 A | * | 3/1971 | Britt | 382/139 |
| 3,593,030 A | * | 7/1971 | Jaskowsky | 250/569 |
| 3,605,092 A | * | 9/1971 | Richard | 382/208 |
| 3,629,822 A | * | 12/1971 | Johnson | 382/320 |
| 3,629,829 A | * | 12/1971 | Ordower | 382/139 |
| 3,638,238 A | * | 1/1972 | Milford et al. | 382/208 |
| 3,744,025 A | * | 7/1973 | Bilgutay | 382/184 |
| 3,764,978 A | * | 10/1973 | Tyburski et al. | 382/318 |
| 3,851,309 A | * | 11/1974 | Kenney et al. | 382/207 |
| 3,873,973 A | * | 3/1975 | Acker | 382/184 |

(Continued)

*Primary Examiner* — Bhavesh Mehta
*Assistant Examiner* — Anthony Mackowey
(74) *Attorney, Agent, or Firm* — Honigman Miller Schwartz and Cohn LLP

(57) ABSTRACT

A method for linking front and rear images in a document processing system involves linking the front and rear images by a magnetic ink character code line. The document processing system includes an imaging device and a magnetic ink character recognition (MICR) reader. The method comprises capturing a first image and first MICR waveform for the front side of the document, and capturing a second image and second MICR waveform for the rear side of the document. A forward recognition algorithm is applied to the first waveform to produce a first code line. A reverse recognition algorithm is applied to the second waveform to produce a second code line. The reverse recognition algorithm considers the second waveform as resulting from the document being read from the rear side of the document when processing the second waveform.

15 Claims, 9 Drawing Sheets

U.S. PATENT DOCUMENTS

| | | | | |
|---|---|---|---|---|
| 3,876,981 | A * | 4/1975 | Welch | 382/182 |
| 3,912,909 | A * | 10/1975 | Harrison | 235/436 |
| 3,949,363 | A * | 4/1976 | Holm | 382/140 |
| 3,978,450 | A * | 8/1976 | Sanner et al. | 382/320 |
| 4,143,355 | A * | 3/1979 | MacIntyre | 382/139 |
| 4,201,978 | A * | 5/1980 | Nally | 382/140 |
| 4,245,211 | A * | 1/1981 | Kao | 382/139 |
| 4,260,880 | A * | 4/1981 | Thomas | 235/454 |
| 4,277,689 | A * | 7/1981 | Thomas et al. | 382/139 |
| 4,277,775 | A * | 7/1981 | Nally et al. | 382/207 |
| 4,277,776 | A * | 7/1981 | Nally et al. | 382/207 |
| 4,326,258 | A * | 4/1982 | de la Guardia | 382/137 |
| 4,356,390 | A * | 10/1982 | Feilchenfeld | 235/455 |
| 4,356,472 | A * | 10/1982 | Hau-Chun Ku et al. | 382/139 |
| 4,389,634 | A * | 6/1983 | Nakamura | 382/182 |
| 4,396,902 | A * | 8/1983 | Warthan et al. | 382/320 |
| 4,399,553 | A * | 8/1983 | Toyama | 382/139 |
| 4,408,342 | A * | 10/1983 | Grabowski et al. | 382/140 |
| 4,441,204 | A * | 4/1984 | Hanna | 382/139 |
| 4,510,615 | A * | 4/1985 | Rohrer | 382/139 |
| 4,523,330 | A * | 6/1985 | Cain | 382/140 |
| 4,542,829 | A * | 9/1985 | Emery et al. | 209/534 |
| 4,547,899 | A * | 10/1985 | Nally et al. | 382/139 |
| 4,684,998 | A * | 8/1987 | Tanioka et al. | 358/473 |
| 4,722,444 | A * | 2/1988 | Murphy et al. | 209/583 |
| 4,776,021 | A * | 10/1988 | Ho | 382/139 |
| 4,797,938 | A * | 1/1989 | Will | 382/139 |
| 4,815,107 | A * | 3/1989 | Kishimoto et al. | 375/343 |
| 4,817,176 | A * | 3/1989 | Marshall et al. | 382/280 |
| 4,821,332 | A * | 4/1989 | Durham | 382/140 |
| 4,827,531 | A * | 5/1989 | Milford | 382/207 |
| 4,876,735 | A * | 10/1989 | Martin et al. | 382/310 |
| 4,914,710 | A * | 4/1990 | Ward et al. | 382/139 |
| 4,968,419 | A * | 11/1990 | Karalus et al. | 209/539 |
| 4,969,054 | A * | 11/1990 | Tsuji et al. | 358/473 |
| 5,014,325 | A * | 5/1991 | Moritomo | 382/135 |
| 5,054,092 | A * | 10/1991 | LaCaze | 382/139 |
| 5,063,599 | A * | 11/1991 | Concannon et al. | 382/137 |
| 5,091,961 | A * | 2/1992 | Baus, Jr. | 382/139 |
| 5,293,431 | A * | 3/1994 | Hayduchok et al. | 382/101 |
| 5,347,593 | A * | 9/1994 | Klinefelter | 382/207 |
| 5,464,099 | A * | 11/1995 | Stevens et al. | 209/3.1 |
| 5,488,676 | A * | 1/1996 | Harding, Jr. | 382/320 |
| 5,540,338 | A * | 7/1996 | Stevens et al. | 209/534 |
| 5,679,942 | A * | 10/1997 | Toyama | 235/449 |
| 5,689,579 | A * | 11/1997 | Josephson | 382/137 |
| 5,729,621 | A * | 3/1998 | Marshall et al. | 382/139 |
| 5,737,440 | A * | 4/1998 | Kunkler | 382/137 |
| 5,784,503 | A * | 7/1998 | Bleecker et al. | 382/306 |
| 5,790,260 | A * | 8/1998 | Myers | 358/296 |
| 5,965,862 | A * | 10/1999 | Momose | 235/449 |
| 6,103,985 | A * | 8/2000 | Shell et al. | 209/587 |
| 6,243,504 | B1 * | 6/2001 | Kruppa | 382/318 |
| 6,351,553 | B1 * | 2/2002 | Hayosh | 382/139 |
| 6,473,519 | B1 * | 10/2002 | Pidhirny et al. | 382/140 |
| 6,504,946 | B1 * | 1/2003 | Rossignoli | 382/139 |
| 6,547,078 | B1 * | 4/2003 | Lile et al. | 209/539 |
| 6,621,920 | B1 * | 9/2003 | Koike | 382/139 |
| 6,654,487 | B1 * | 11/2003 | Downs, Jr. | 382/139 |
| 6,659,347 | B1 * | 12/2003 | Moore et al. | 235/449 |
| 6,863,214 | B2 * | 3/2005 | Garner et al. | 235/379 |
| 6,924,450 | B2 * | 8/2005 | Maloney | 209/583 |
| 6,928,183 | B2 * | 8/2005 | Mitchell et al. | 382/139 |
| 7,177,840 | B2 * | 2/2007 | Maloney | 705/45 |
| 7,219,831 | B2 * | 5/2007 | Murata | 235/379 |
| 7,327,868 | B2 * | 2/2008 | Perner et al. | 382/140 |
| 7,474,779 | B2 * | 1/2009 | Duncan | 382/137 |
| 7,474,780 | B2 * | 1/2009 | Volpa | 382/139 |
| 7,558,418 | B2 * | 7/2009 | Verma et al. | 382/137 |
| 7,590,275 | B2 * | 9/2009 | Clarke et al. | 382/137 |
| 7,647,275 | B2 * | 1/2010 | Jones | 705/40 |
| 7,665,655 | B2 * | 2/2010 | Johannesson et al. | 235/375 |
| 7,711,176 | B2 * | 5/2010 | Rossignoli | 382/140 |
| 7,715,633 | B2 * | 5/2010 | Kanamoto et al. | 382/190 |
| 7,735,721 | B1 * | 6/2010 | Ma et al. | 235/379 |
| 2001/0045452 | A1 * | 11/2001 | Momose et al. | 235/379 |
| 2002/0067846 | A1 * | 6/2002 | Foley | 382/139 |
| 2002/0184151 | A1 * | 12/2002 | Maloney | 705/45 |
| 2003/0214689 | A1 * | 11/2003 | Johannesson et al. | 358/538 |
| 2004/0062431 | A1 * | 4/2004 | O'Neill | 382/137 |
| 2004/0076320 | A1 * | 4/2004 | Downs, Jr. | 382/139 |
| 2004/0130337 | A1 * | 7/2004 | Clark | 324/693 |
| 2005/0012967 | A1 * | 1/2005 | Okamura | 358/474 |
| 2005/0018896 | A1 * | 1/2005 | Heit et al. | 382/137 |
| 2005/0041268 | A1 * | 2/2005 | Panini | 358/474 |
| 2005/0047641 | A1 * | 3/2005 | Volpa | 382/137 |
| 2005/0074159 | A1 * | 4/2005 | Mitchell et al. | 382/139 |
| 2005/0127160 | A1 * | 6/2005 | Fujikawa | 235/379 |
| 2005/0139671 | A1 * | 6/2005 | McGlamery et al. | 235/449 |
| 2005/0163362 | A1 * | 7/2005 | Jones et al. | 382/137 |
| 2005/0178834 | A1 * | 8/2005 | Natsuno | 235/449 |
| 2005/0213804 | A1 * | 9/2005 | Simmons | 382/137 |
| 2006/0045321 | A1 * | 3/2006 | Yu | 382/137 |
| 2006/0110023 | A1 * | 5/2006 | Goetz et al. | 382/139 |
| 2006/0182331 | A1 * | 8/2006 | Gilson et al. | 382/137 |
| 2006/0182332 | A1 * | 8/2006 | Weber | 382/139 |
| 2007/0045930 | A1 * | 3/2007 | Hayduchok et al. | 271/2 |
| 2007/0203715 | A1 * | 8/2007 | Kane | 705/1 |
| 2007/0217669 | A1 * | 9/2007 | Swift et al. | 382/139 |
| 2007/0288382 | A1 * | 12/2007 | Narayanan et al. | 705/45 |
| 2008/0137939 | A1 * | 6/2008 | Wang et al. | 382/139 |

* cited by examiner

| | | | |
|---|---|---|---|
| 1 | 2 | 3 | 4 |
| Character One | Character Two | Character Three | Character Four |
| 5 | 6 | 7 | 8 |
| Character Five | Character Six | Character Seven | Character Eight |
| 9 | 0 | ⑆ | ⑈ |
| Character Nine | Character Zero | Symbol R-T | Symbol Amount |
| ⑉ | ⑇ | | |
| Symbol On-Us | Symbol Dash | | |

Character 7

Character 8

Character 9

Character 0

Character ⠒

Character ⠇

METHOD AND SYSTEM FOR LINKING FRONT AND REAR IMAGES IN A DOCUMENT READER/IMAGER

BACKGROUND OF THE INVENTION

1. Field of the Invention

The invention relates to document processing, document imaging, and magnetic ink character recognition. The invention further relates to hand-operated document readers/imagers, and to methods and systems for linking front and rear images in a document reader/imager.

2. Background Art

A typical document processing system includes a feeder and a separator in the document-feeding portion of the system, and a series of roller pairs or belts in the document-transporting portion of the system. In the feeding portion of the system, the feeder acts with the separator to feed documents singly, in order, from a stack. In the transporting portion of the system, the roller pairs and/or belts convey the documents, one at a time, past other processing devices such as readers, printers, and sorters that perform operations on the documents. The feeder is typically a feed wheel, but may take other forms. The separator may be a wheel, but also may take other forms such as a belt. Further, the components in the transporting portion of the system may take a variety of forms.

In addition to large document processing systems that handle stacks of documents, smaller systems also exist. These smaller document processing systems may handle smaller stacks of documents, or may even handle single documents, fed one at a time. There are also hand-operated document readers/imagers.

Banks, credit unions, and other financial institutions use document processing systems to regularly process checks, deposit slips, and other types of bank documents in order to execute financial transactions efficiently. Document processing systems have therefore become quite prevalent in the industry. Typically, information is printed on these documents in magnetic ink which can be read both by the human eye and a computer. This form of printing is read by a process called magnetic ink character recognition (MICR). As part of the recognition process, a MICR magnetic read head is used to read the information printed on the document.

Conventional approaches to MICR reading and recognition generally involve determining peak position information for a waveform generated by a single gap magnetic read head. This peak information typically includes information regarding the amount of time between the peaks of each character. Knowledge of the velocity of the document (and thus, the velocity of the characters which are printed on the document) allows this time information to be converted into distance information, which can be compared to the MICR character peak profiles as contained in the ANSI X9.27-2000 "Print and Test Specifications for Magnetic Ink Printing (MICR)" as promulgated by the American National Standards Institute. Based on the design of the standard E-13B character set, in order that a MICR reader reliably read with a high correct character read rate and with a very low substitution rate, the document velocity must be precisely known during reading or otherwise be speed-controlled so that it does not vary.

These conventional approaches are acceptable when the velocity of the document is either known or can be controlled. In fact, conventional approaches to MICR typically involve rather complex schemes for controlling the velocity of the document or attempting to measure its velocity at different times as the document moves past the MICR read head. There has also been an approach to MICR reading and recognition that utilizes a dual gap read head to eliminate the need for precise knowledge or control of the document velocity.

In a hand-operated document reader/imager, the document is placed on a base and the MICR/image device is moved over the document from right to left, which is the traditional direction of larger document readers. During this movement, the MICR characters are recognized and the front image of the document is captured.

In order to capture the rear image of the document, the document must be removed from the base of the hand-operated check reader/imager, flipped over, and placed back on the base. This manual step in the processing could lead to errors. The operator could place a different document on the base.

For the foregoing reasons, there is a need for a method that will verify that the original document was placed back on the hand-operated check reader so as to avoid the accidental association of a front image with an incorrect rear image.

SUMMARY OF INVENTION

It is an object of the invention to provide an improved method and system for linking front and rear images in a document reader/imager that reduce the likelihood of accidentally associating a front image with an incorrect rear image.

The invention comprehends linking the front and rear images with the MICR code line. According to the invention, during the capture of the front image, the MICR code line is read/recognized (converted to text characters) according to a traditional, "forward" MICR algorithm. During the capture of the rear image, the MICR code line is read/recognized (converted to text characters) according to a "reverse" MICR algorithm.

The "reverse" MICR algorithm compares the MICR signal from the document with patterns that are expected when the document is processed backwards. These patterns include the MICR signal being reversed and inverted, having a lower amplitude, and having lower quality. If the "reverse" MICR algorithm is successful in recognizing each character, then this result can be used confidently for the document.

The code line obtained during the front image capture and the code line obtained during the rear image capture are then compared. If the code lines do not match, this indicates an error and the operator may be instructed to check the document. The front image of the document could be displayed to the operator in order to prompt the operator to locate the correct document for rear image capture.

The advantages associated with embodiments of the invention are numerous. For example, methods and systems of the invention for linking front and rear images may be utilized in hand-operated document readers/imagers to assure that the same document is used for the front capture and corresponding rear capture. Further, methods and systems of the invention may also be utilized in other document processing systems to provide additional data integrity. That is, embodiments of the invention may be employed in hand-operated document readers/imagers, and may be employed in document processing systems including automated document readers/imagers when both sides of the documents are read using either multiple devices or a multiple-pass approach.

BRIEF DESCRIPTION OF THE DRAWINGS

FIG. 1 shows the outline and shape of the fourteen characters and symbols which are called the E-13B MICR character set as used on many financial payment documents;

DETAILED DESCRIPTION OF THE PREFERRED EMBODIMENTS

FIG. 1 illustrates the E-13B character set at 50. The character set 50 contains ten characters and four symbols as defined in the ANSI X9.27-2000 "Print and Test Specifications for Magnetic Ink Printing (MICR)." When used on a document for automated machine reading, the characters and symbols in the set must be printed using magnetic ink. ANSI X9.27 defines the dimensions of each character/symbol and the expected nominal waveform peak position and relative amplitude of waveform peaks.

Figure 2A:
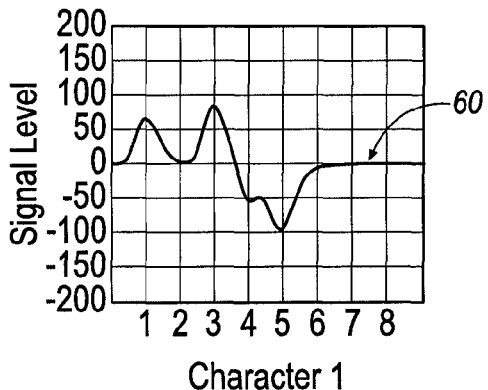
FIGS. 2A-2N show the set of waveforms for the E-13B characters and symbols as read from a responsive magnetic signal gap read head when the magnetized characters are passed by the magnetic read head.
Figure 2B:
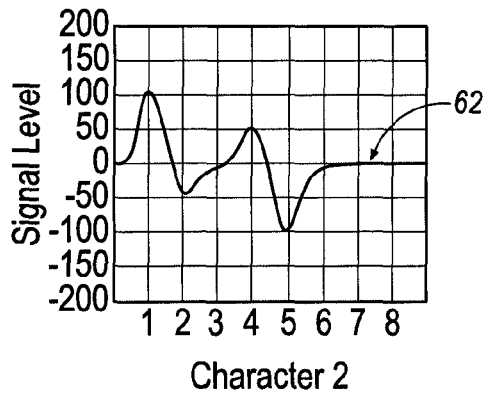
Figure 2C:
Figure 2D:
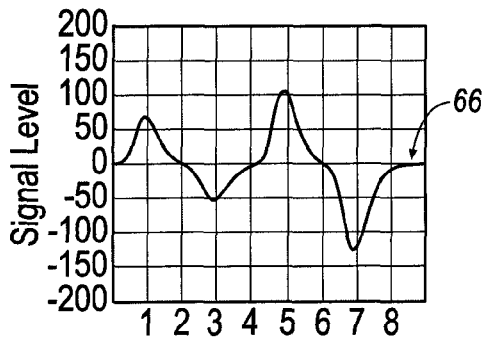
Figure 2E:
Figure 2F:
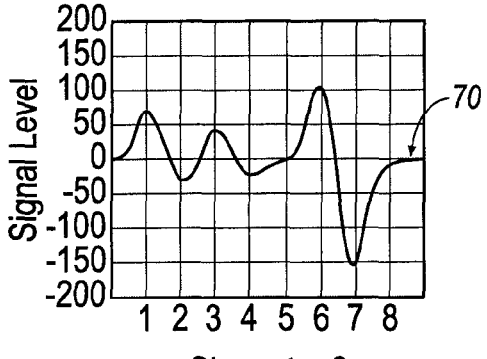
Figure 2G:
Figure 2H:
Figure 2I:
Figure 2J:
Figure 2K:
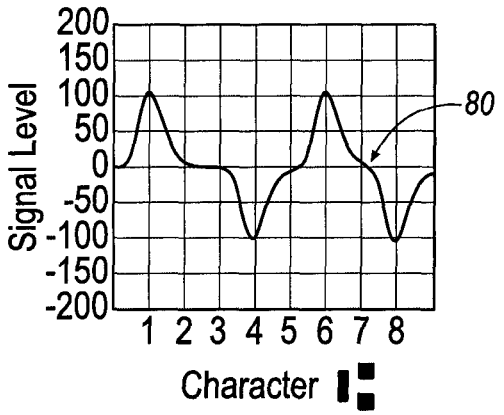
Figure 2L:
Figure 2M:
Figure 2N:
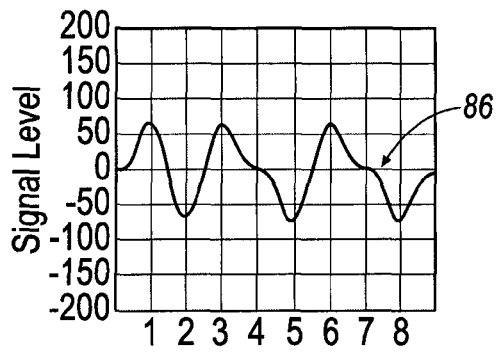

FIGS. 2A-2N demonstrate the waveform details of each of the characters/symbols shown in FIG. 1 when each character/symbol is moved past a single gap magnetic read head at a given constant velocity. FIG. 2A shows the waveform 60 for the character "1" as the character is moved past the read head. FIG. 2B shows the waveform 62 for the character "2" as the character is moved past the read head. FIG. 2C shows the waveform 64 for the character "3" as the character is moved past the read head. FIG. 2D shows the waveform 66 for the character "4" as the character is moved past the read head. FIG. 2E shows the waveform 68 for the character "5" as the character is moved past the read head. FIG. 2F shows the waveform 70 for the character "6" as the character is moved past the read head. FIG. 2G shows the waveform 72 for the character "7" as the character is moved past the read head. FIG. 2H shows the waveform 74 for the character "8" as the character is moved past the read head. FIG. 2I shows the waveform 76 for the character "9" as the character is moved past the read head. FIG. 2J shows the waveform 78 for the character "0" as the character is moved past the read head. FIG. 2K shows the waveform 80 for the symbol "R-T" as the symbol is moved past the read head. FIG. 2L shows the waveform 82 for the symbol "Amount" as the symbol is moved past the read head. FIG. 2M shows the waveform 84 for the symbol "On-Us" as the symbol is moved past the read head. FIG. 2N shows the waveform 86 for the symbol "Dash" as the symbol is moved past the read head.

In most applications, the characters are first magnetized prior to the characters being presented past the read heads. As shown, each unit on the x-axis represents 0.013 inches. The first character peak is aligned with the first position and the remaining peaks generally align with other vertical grid lines because the MICR characters/symbols are designed using increments of 0.013 inches in the horizontal direction. For those cases where the change in magnetic flux is not perfectly aligned, it is caused by the effects of the radii shifting the position of the maximum rate of change to the left.

Examples are the character "3", FIG. 1, with the six radii at the left of the character and the character "0", FIG. 1, with the large interior radii and large outside radii at the left hand stroke. The waveform 64 in FIG. 2C illustrates the fourth peak shift to the left for the character "3" and the waveform 78 in FIG. 2J shows the left shift of both peaks three and four for the character "0". Normally, in order to produce waveforms where the peaks correspond to known dimensions such as 0.013 inches, the velocity of the characters passing the read heads must be precisely set. Otherwise, the character peaks will be out of scale.

Figure 3:
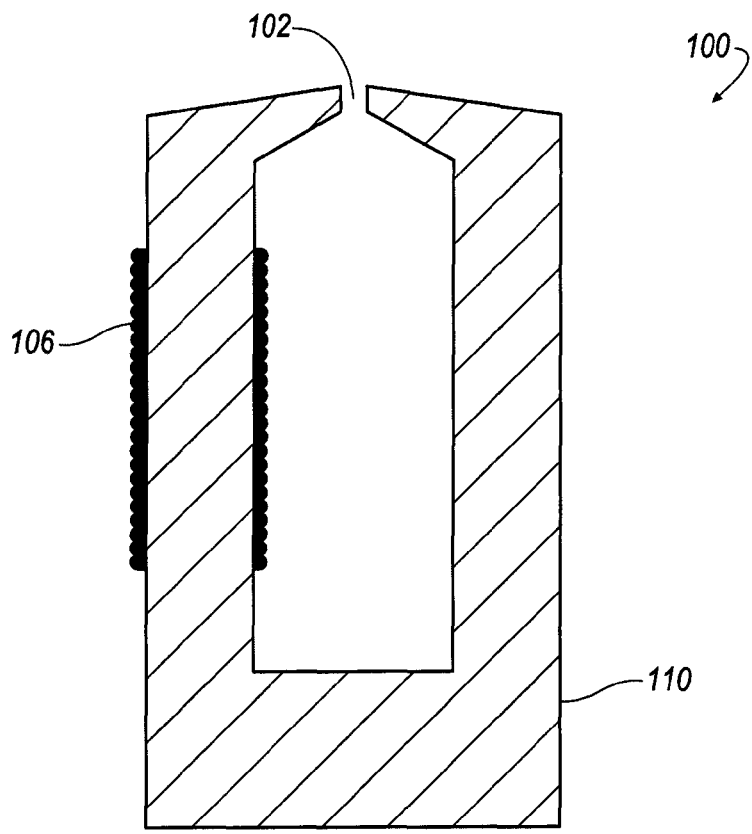
FIG. 3 is a cross-section view of a read head, which is one example of a suitable read head for reading magnetic ink characters.

In FIG. 3, a read head is generally indicated at 100, and includes a gap 102. The read head utilizes sensing coil 106. Core 110 forms a path for the magnetic flux changes experienced when the reader passes over magnetic ink. Of course, it is appreciated that alternative readers may be used, and any suitable technique may be utilized for assuring that flux variation from the magnetic ink characters is sensed.

Figure 4:
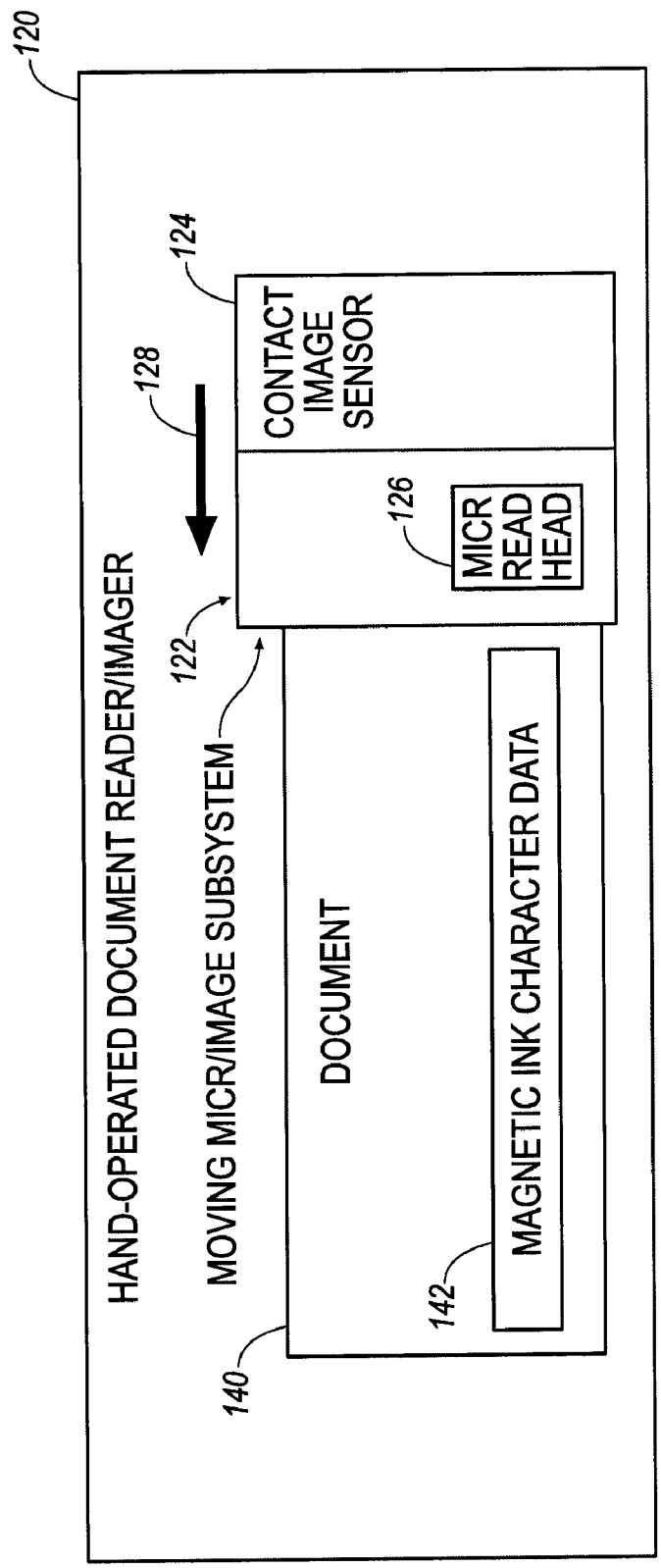
FIG. 4 illustrates a hand-operated document reader/imager made in accordance with the invention.

An exemplary embodiment of the invention is illustrated in FIGS. 4-8. FIG. 4 illustrates a hand-operated document reader/imager 120. Document reader/imager 120 includes a moving MICR/image subsystem 122. Subsystem 122 includes a contact image sensor 124 and a MICR read head 126. Contact image sensor 124 captures an image of the document 140 when subsystem 122 is moved across the document 140. Contact image sensor 124 captures the front image of the document 140 when the document 140 is placed face-up on the base of the reader/imager 120 and the MICR/image subsystem 122 is moved from right to left over document 140 as indicated by arrow 128. To capture the rear image of document 140, document 140 is removed from the base of the reader/imager 120, flipped over, and placed back on the base of reader/imager 120. Thereafter, contact image sensor 124 captures the rear image of the document 140, with the document 140 being face-down on the base of reader/imager 120, when MICR/image subsystem 122 is moved from right to left over document 140 as indicated by arrow 128.

MICR read head 126 is for reading the magnetic ink character data 142 on document 140. During the front image capture, the MICR code line is read according to a traditional, "forward" MICR algorithm as MICR read head 126 passes from right to left over the magnetic ink character data 142 on document 140. During the rear image capture, the MICR code line is read according to a "reverse" MICR algorithm as MICR read head 126 passes from right to left over document 140. In this way, the characters are read in reverse order. In order to read the MICR code line during rear image capture, the "reverse" MICR algorithm compares the MICR signal from the document with patterns that are expected when the document is processed from the back.

Figure 5:
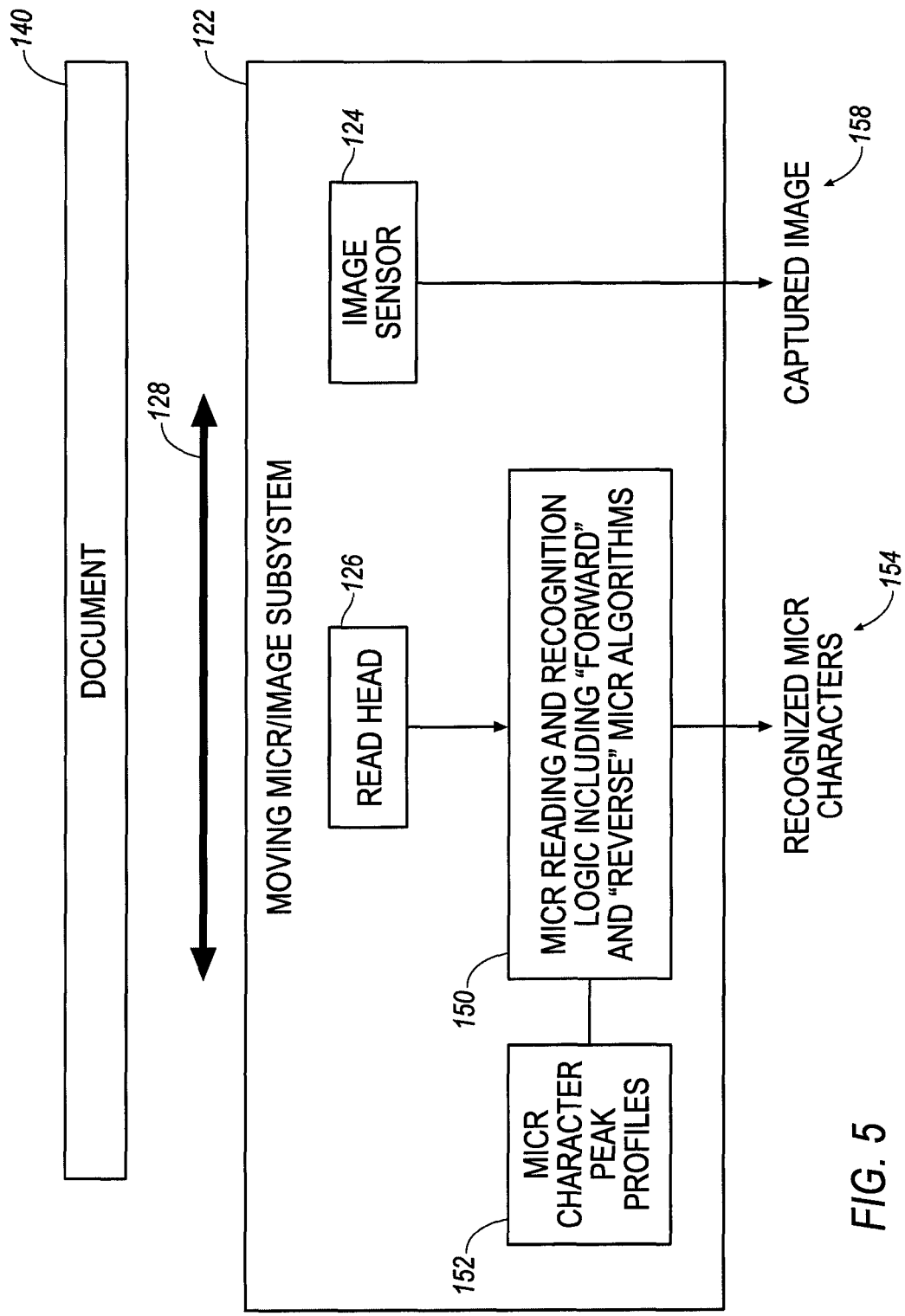
FIG. 5 is a block diagram illustrating a system for linking front and rear images in the hand-operated document reader/imager.

FIG. 5 is a block diagram illustrating a system for linking front and rear images in the hand-operated document reader/imager by using the MICR code line to link the front and rear images. As shown, the document 140 is placed on the base of the reader/imager for front image capture, and then flipped over and placed back on the base for rear image capture. Moving MICR/image subsystem 122 is moved across the document as indicated by arrow 128. Block 150 represents the MICR reading and recognition logic. Logic 150 includes a traditional, "forward" MICR algorithm as understood by one of ordinary skill in the art.

In the traditional, "forward" MICR algorithm, the waveform obtained from the read head 126 is compared against known MICR character peak profiles 152 (FIGS. 2A-2N). If the recognition is successful, the MICR reading and recognition logic 150 determines the recognized MICR characters 154. The traditional, "forward" MICR algorithm is applied during the front image capture by image sensor 124 of a face-up document.

In accordance with the invention, logic 150 further includes a "reverse" MICR algorithm that is utilized to process a face-down document during rear image capture. More specifically, when a document/item that is being read by read head 126 and processed by reading and recognition logic 150 is a document that is face-down for rear image capture, the waveform obtained from the read head 126 is compared against patterns that are expected when the document is processed face-down, that is, backwards, with the magnetic ink characters being read in reverse as read head 126 passes from right to left over the document 140. The face-down document will generate a waveform that is reversed and inverted. The waveform is reversed because the characters/symbols will be read in the reverse order as the read head passes over the document because the document is face-down. Because the flux change when the leading edge of the character string reaches the read head is positive, the first sensed peak is always a positive peak. Accordingly, when the document is face-down, the waveform is inverted. In addition, the waveform will likely have reduced amplitude and signal quality due to the read head 126 reading through the document 140 because the magnetic ink is on the far side of the document due to the document being oriented face-down.

In the "reverse" MICR algorithm, the waveform obtained from the read head 126 is still compared against known MICR character peak profiles 152 (FIGS. 2A-2N); however, consideration is given to the fact that the waveform is reversed, inverted, and possibly has reduced amplitude and signal quality due to the document being face-down for rear image capture. If the recognition is successful, the MICR reading and recognition logic 150 determines the recognized MICR characters 154.

In accordance with the invention, the MICR code line recognized during the front image capture and the MICR code line recognized during the rear image capture are compared to assure that the same document was used for front and rear image capture. More specifically, the front and rear images are linked by the MICR code line. If the code line recognized during front image capture does not agree with the code line recognized during rear image capture, this indicates an error and an operator may be instructed to check the document. The front image of the document may be displayed to the operator in order to prompt the operator to locate the correct document for rear image capture.

It is appreciated that one approach to implementing the invention requires that both MICR code lines are fully recognized and match each other to assure that the same document is used for both front image capture and rear image capture. However, it is appreciated that the MICR code line obtained during front image capture may be deemed to be the correct code line, and the MICR code line obtained during rear image capture need not be fully recognized. Put another way, a partial recognition of the MICR code line during rear image capture may be sufficient to verify that it is in fact the same document as used previously for the front image capture. For example, some applications may only require that a predetermined percentage of the characters match. In addition, it is to be appreciated that methods and systems of the invention may be utilized in other document processing systems to provide additional data integrity, including systems that have automated document readers/imagers when both sides of the documents are read using either multiple devices or a multiple-pass approach.

Figure 6:
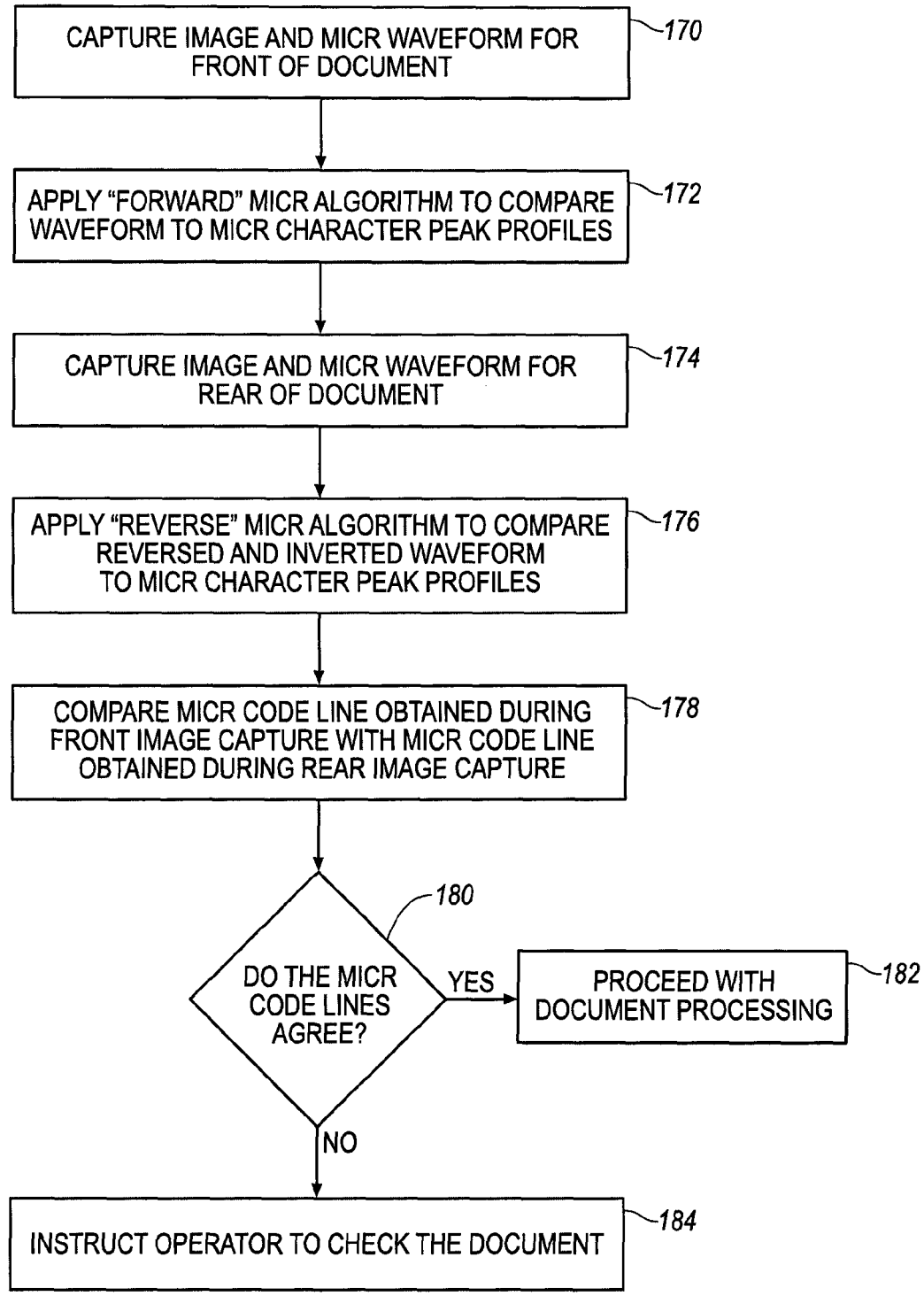
FIG. 6 is a flow chart illustrating a method for linking front and rear images in the hand-operated document reader/imager.

FIG. 6 is a flow chart illustrating a method for linking front and rear images in the hand-operated document reader/imager in accordance with the invention. At block 170, the document image and MICR waveform are captured for the front of the document. At block 172, the traditional, "forward" MICR algorithm is applied to compare the waveform obtained during front image capture to the known MICR character peak profiles. At block 174, the document image and MICR waveform are captured for the rear of the document. At block 176, the "reverse" MICR algorithm is applied.

The waveform obtained during rear image capture is still compared against the known MICR character peak profiles, but the waveform is compared against patterns that would be expected when the document is processed from the back. Put another way, the backwards document produces a reversed and inverted waveform. This waveform may be corrected and then compared against the normal peak profiles, or the uncorrected waveform may be compared against a set of modified peak profiles. The particular details of the comparison may vary, with the important fact being that consideration is given to the fact that the original waveform is reversed, inverted, and possibly has reduced amplitude and signal quality due to the document being read from the back.

At block 178, the MICR code line obtained during the front image capture (as determined by the "forward" MICR algorithm at block 172) is compared to the MICR code line obtained during the rear image capture (as determined by the "reverse" MICR algorithm at block 176). According to decision block 180, if the code line recognized during front image capture does not agree with the code line recognized during rear image capture, this indicates an error and an operator may be instructed to check the document as depicted at block 184. In the event that the code lines agree, normal document processing continues as indicated at block 182.

Figure 7:
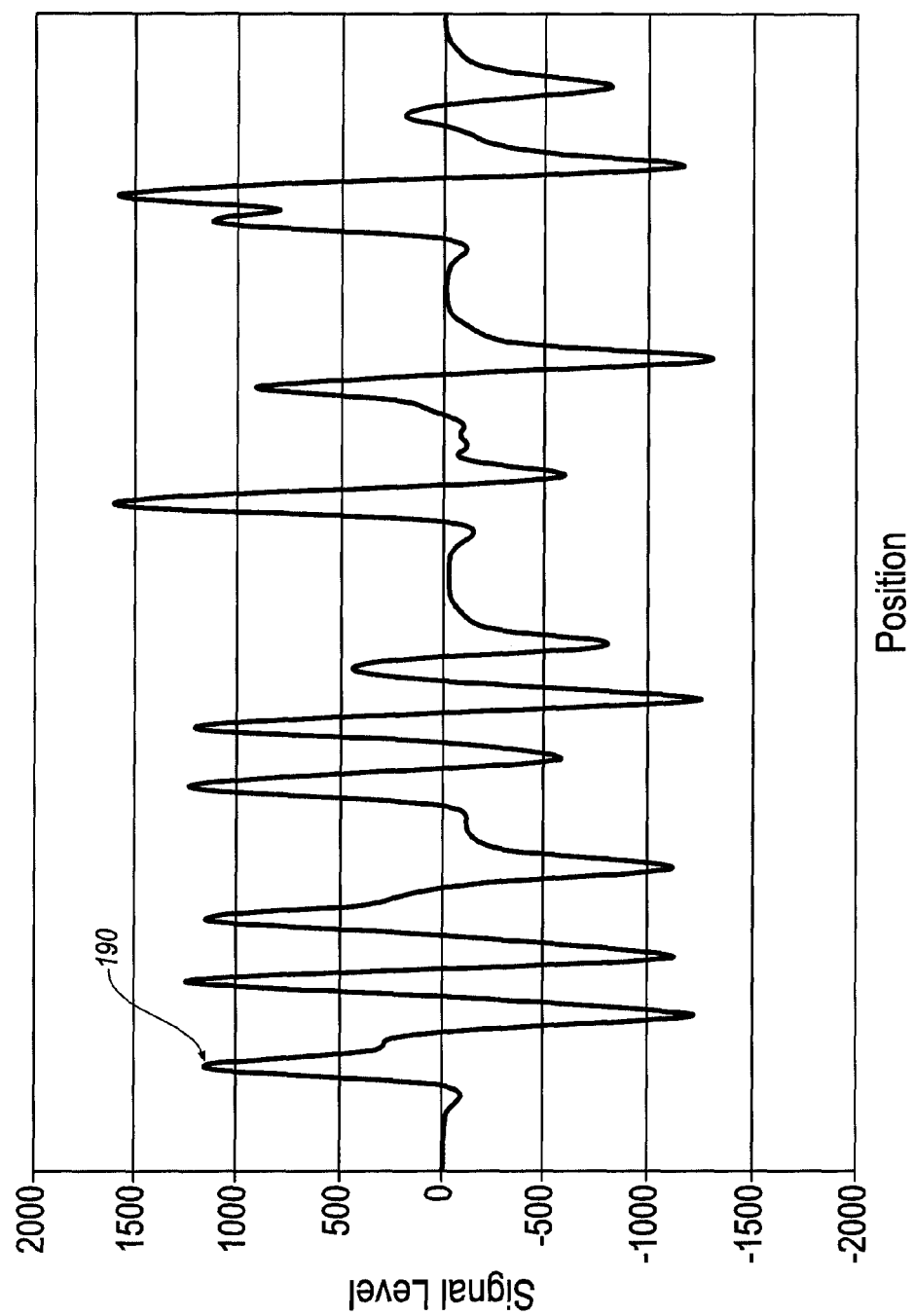
FIG. 7 illustrates a waveform for magnetic ink characters/symbols 3, 5, 7, Amount when the document containing the characters/symbols is inserted face up for front image capture in the hand-operated document reader/imager, and the magnetic ink characters/symbols are passed over from right to left.
Figure 8:
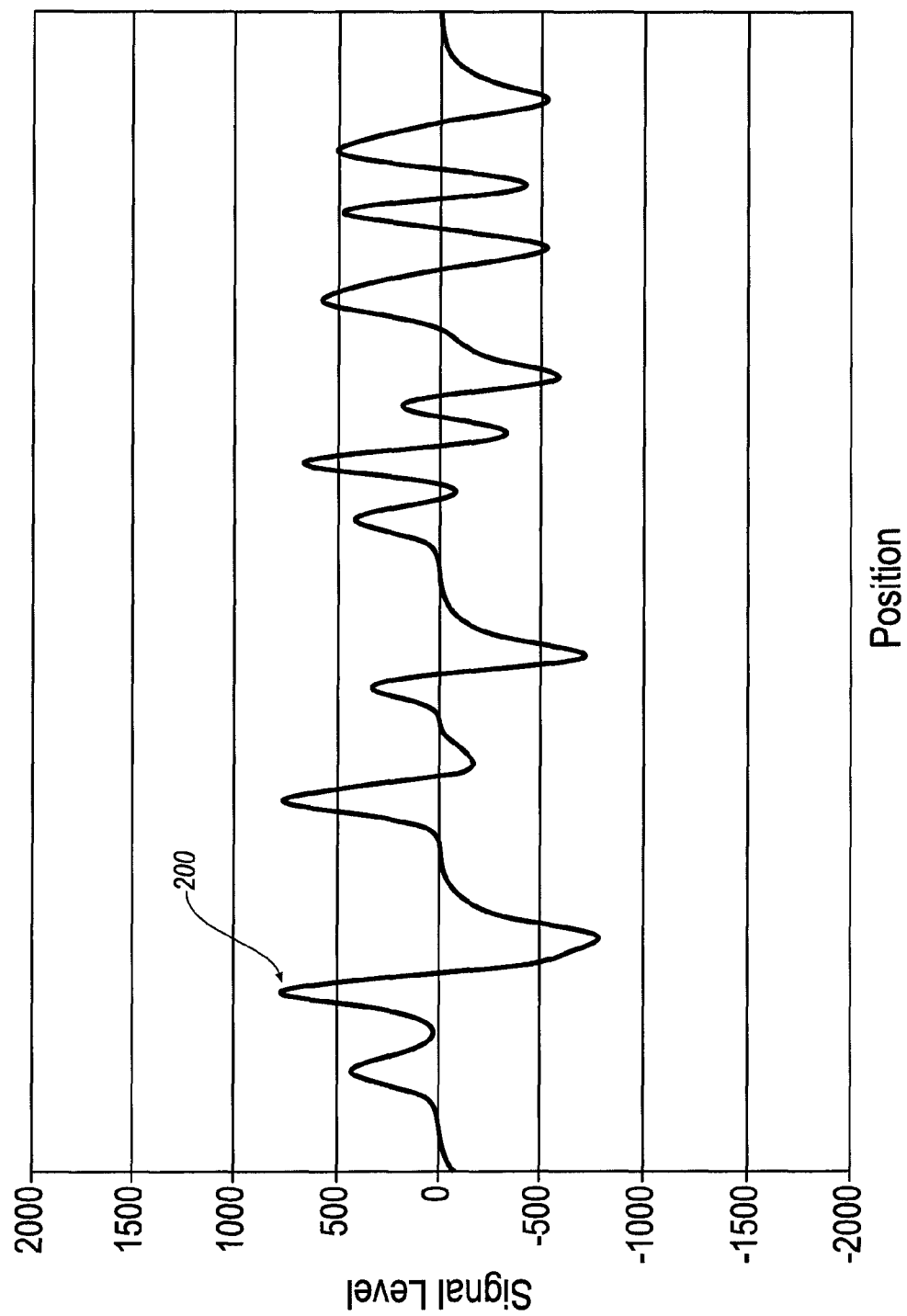
FIG. 8 illustrates a waveform for magnetic ink characters/symbols 3, 5, 7, Amount when the document containing the characters/symbols is inserted face down for rear image capture in the hand-operated document reader/imager, and the magnetic ink characters/symbols are passed over from right to left and read in reverse order.

FIG. 7 illustrates a waveform 190 for magnetic ink characters/symbols 3, 5, 7, Amount when the document containing the characters/symbols is inserted face up for front image capture in the hand-operated document reader/imager, and the magnetic ink characters/symbols are passed over from right to left. When this same document is read during the rear image capture, the waveform becomes reversed and inverted. FIG. 8 illustrates a waveform 200 for magnetic ink characters/symbols 3, 5, 7, Amount when the document containing the characters/symbols is inserted face down for rear image capture in the hand-operated document reader/imager, and the magnetic ink characters/symbols are passed over from right to left and read in reverse order. As shown, waveform 200 is reversed with respect to waveform 190 because the characters/symbols are read in the reverse order due to the document being oriented face-down. In addition, waveform 200 is inverted with respect to waveform 190 because when the edge of the character string reaches the read head, the first peak is positive due to the sensed increase in magnetic flux. Finally, waveform 200 has reduced amplitude with respect to waveform 190 due to the read head having to read through the document to read the characters.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A method for linking front and rear images in a document processing system, the document processing system including an imaging device and a magnetic ink character recognition (MICR) reader, the method comprising:
    capturing a first image and a first waveform for a magnetic ink character sting from a document, the first image and the first waveform corresponding to the front side of the document;
    applying a forward recognition algorithm to compare the first waveform to a set of known character profiles to produce a first code line;
    capturing a second image and a second waveform for the magnetic ink character string from the document, the second image and the second waveform corresponding to the rear side of the document;
    applying a reverse recognition algorithm to compare the second waveform to the set of known character profiles to produce a second code line, wherein the reverse recognition algorithm considers the second waveform as resulting from the document being read from the rear side of the document when comparing the second waveform to the set of known character profiles; and
    comparing the first code line to the second code line to verify that the first image and the second image are captured from the same document.

2. The method of claim 1 further comprising:
    determining that the first code line and the second code line are in agreement when the recognized characters from the first code line match the recognized characters from the second code line.

3. The method of claim 2 wherein all recognized characters from the first code line and the second code line must match in order for the first code line and the second code line to be determined as in agreement with each other.

4. The method of claim 2 wherein a predetermined percentage of the recognized characters from the first code line and the second code line must match in order for the first code line and the second code line to be determined as in agreement with each other.

5. The method of claim 2 further comprising:
    in the event that the first code line and the second code line disagree with each other, prompting an operator of the document processing system to check that the same document was used for the front image capture and the rear image capture.

6. The method of claim 2 further comprising:
    in the event that the first code line and the second code line agree with each other, proceeding with the processing of the document and associating the front image and the rear image with the document.

7. The method of claim 1 wherein the reverse recognition algorithm considers the determined waveform as being reversed due to the document being oriented backwards when passing through the magnetic ink character recognition reader.

8. The method of claim 7 wherein the reverse recognition algorithm considers the determined waveform as being inverted due to the document being oriented backwards when passing through the magnetic ink character recognition reader.

9. A document processing system for linking front and rear images comprising
    an image sensor and
    a magnetic ink character recognition (MICR) read head, the system configured to:
        capture a first image and a first waveform for a magnetic ink character string from a document using the image sensor and MICR read head, the first image and the first waveform corresponding to the front side of the document;
        apply a forward recognition algorithm to compare the first waveform to a set of known character profiles to produce a first code line;
        capture a second image and a second waveform for the magnetic ink character string from the document using the image sensor and MICR read head, the second image and the second waveform corresponding to the rear side of the document;
        apply a reverse recognition algorithm to compare the second waveform to the set of known character profiles to produce a second code line, wherein the reverse recognition algorithm considers the second waveform as resulting from the document being read from the rear side of the document when comparing the second waveform to the set of known character profiles; and
        compare the first code line to the second code line to verify that the first image and the second image are captured from the same document.

10. The system of claim 9 wherein the system is further configured to:
    determine that the first code line and the second code line are in agreement when the recognized characters from the first code line match the recognized characters from the second code line.

11. The system of claim 10 wherein all recognized characters from the first code line and the second code line must match in order for the first code line and the second code line to be determined as in agreement with each other.

12. The system of claim 10 wherein a predetermined percentage of the recognized characters from the first code line and the second code line must match in order for the first code line and the second code line to be determined as in agreement with each other.

13. The system of claim 10 wherein the system is further configured to:
    in the event that the first code line and the second code line disagree with each other, prompt an operator of the document processing system to check that the same document was used for the front image capture and the rear image capture.

14. The system of claim 10 wherein the system is further configured to:
    in the event that the first code line and the second code line agree with each other, proceed with the processing of the document and associating the front image and the rear image with the document.

15. A document reader/imager comprising
    a magnetic ink character recognition and imaging subsystem comprising an image sensor and a magnetic ink character recognition (MICR) read head, the subsystem configured to:
    capture a first image and a first waveform for a magnetic ink character string from a document using the image sensor and MICR read head as the subsystem is manually moved across the document by the an operator, the first image and the first waveform corresponding to the front side of the document;

apply a forward recognition algorithm to compare the first waveform to a set of known character profiles to produce a first code line;

capture a second image and a second waveform for the magnetic ink character string from the document using the image sensor and MICR read head as the subsystem is manually moved across the document by the an operator, the second image and the second waveform corresponding to the rear side of the document;

apply a reverse recognition algorithm to compare the second waveform to the set of known character profiles to produce a second code line, wherein the reverse recognition algorithm considers the second waveform as resulting from the document being read from the rear side of the document when comparing the second waveform to the set of known character profiles; and compare the first code line to the second code line to verify that the first image and the second image are captured from the same document.

* * * * *